United States Patent [19]

Erspamer

[11] 3,931,747

[45] Jan. 13, 1976

[54] GYROSCOPIC STABLE REFERENCE DEVICE

[75] Inventor: James R. Erspamer, Phoenix, Ariz.

[73] Assignee: Sperry Rand Corporation, New York, N.Y.

[22] Filed: Feb. 6, 1974

[21] Appl. No.: 440,119

[52] U.S. Cl. ............................... 74/5.34; 74/5.41
[51] Int. Cl.² ................................. G01C 19/02
[58] Field of Search ........ 244/165, 79; 74/5.34, 5.4, 74/5.8, 5.41; 73/1 D, 504

[56] References Cited
UNITED STATES PATENTS

| | | | |
|---|---|---|---|
| 3,069,912 | 12/1962 | Faux et al. | 74/5.34 |
| 3,355,954 | 12/1967 | Levine et al. | 74/5.34 |
| 3,456,513 | 7/1969 | Emerson | 74/5.34 X |
| 3,640,137 | 2/1972 | Allen et al. | 74/5.41 |
| 3,648,525 | 3/1972 | Reed | 74/5.8 |

Primary Examiner—Charles J. Myhre
Assistant Examiner—William C. Anderson
Attorney, Agent, or Firm—Howard P. Terry

[57] ABSTRACT

A gyroscopic stable reference system for navigable craft is provided that provides heading, pitch, and roll outputs substantially free of errors at all aircraft attitudes.

8 Claims, 5 Drawing Figures

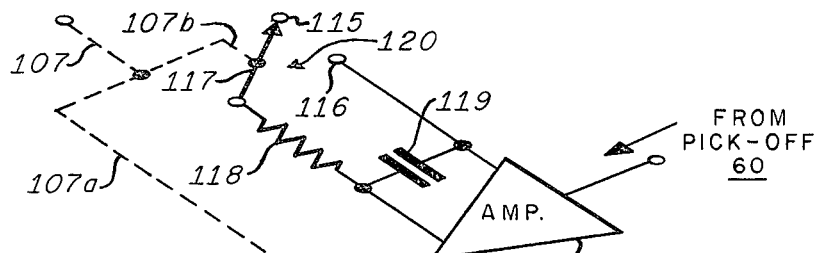
FIG. 2.
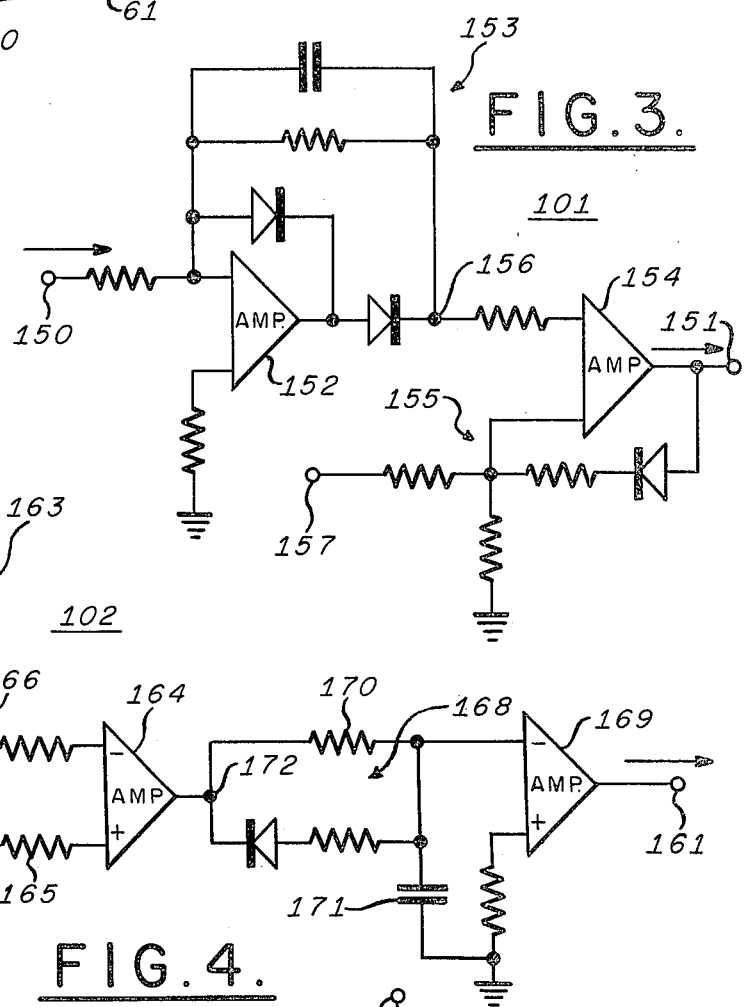
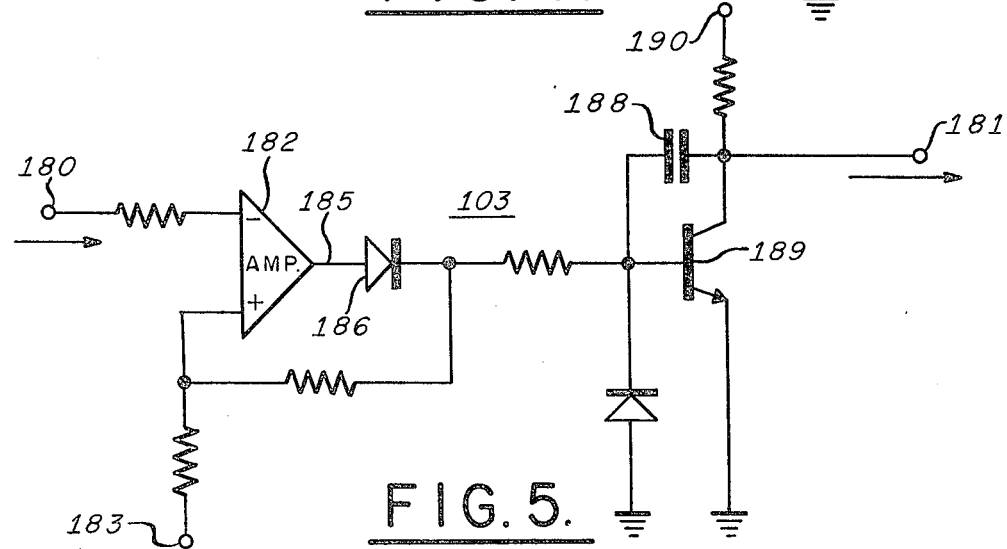

GYROSCOPIC STABLE REFERENCE DEVICE

BACKGROUND OF THE INVENTION

1. Field of the Invention:

The invention pertains to precision gyroscopic stable platforms for providing attitude information about three mutually perpendicular reference axes with respect to an aircraft; the invention provides a control arrangement for momentarily disabling the outer roll gimbal servo and for preventing unstable operation of the apparatus in particular flight circumstances.

2. Description of the Prior Art:

The present invention is an improvement useful in stable gyroscopic platforms of the type described in the Charles B. Reed U.S. Pat. No. 3,648,525 for a "Gyroscopic Stable Reference Apparatus", issued Mar. 14, 1972, and assigned to the Sperry Rand Corporation.

The invention of the Reed patent was devised to utilize a relatively simple construction having five gyroscopically stabilized gimbals and only one servoed gimbal, thereby rendering the stable platform relatively inexpensive, simple to manufacture, and more reliable in operation. The gimballing arrangement of the Reed device provides an all-attitude capability at the same time additionally providing accurate attitude information with respect to the three orthogonal axes of the craft on which it is mounted. By stabilizing the directional gyroscope in both pitch and roll, heading information is provided generally free from the gimbal errors of a conventionally mounted directional gyroscope. However, one difficulty remains indentifiable in the Reed device, since under certain conditions of operation in an aircraft, the outer roll servo loop of the instrument can become unstable and the outer roll gimbal may thereupon oscillate or even spin about its axis, destroying the validity of the navigation output information of the instrument.

SUMMARY OF THE INVENTION

Like the Reed device, the present invention employs a configuration having five gyroscopic gimbals and a single servo system, a configuration that is relatively easy to manufacture, relatively inexpensive, and reliable. The gimbal arrangement again provides an all-attitude capability and precise roll, pitch, and heading attitude data about three mutually perpendicular axes. Heading data free of the effects of gimbal errors is generated. The invention provides an arrangment for momentarily disabling the outer roll gimbal servo for preventing unstable operation of the instrument in particular flight attitudes of the aircraft and thereby provides an accurate, full freedom platform without output signal discontinuities at extreme attitudes.

BRIEF DESCRIPTION OF THE DRAWINGS

FIG. 2 is an alternative form of the control circuit of FIG. 1.

FIGS. 3, 4, and 5 show details of circuits suitable for use in FIGS. 1 and 2.

DESCRIPTION OF THE PREFERRED EMBODIMENTS

Figure 1:
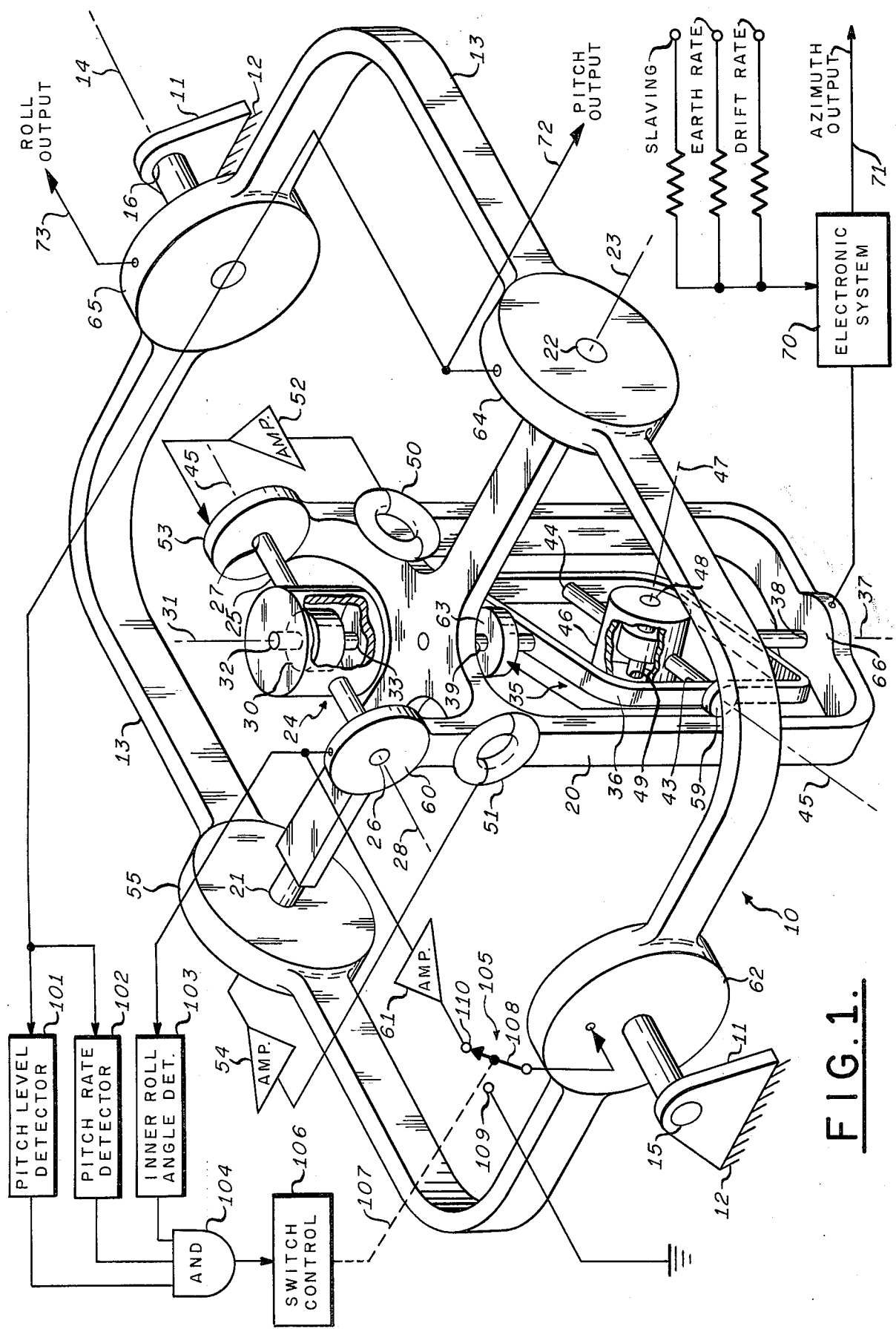
FIG. 1 of the drawings discloses a schematic isometric view of a gyroscopic stable reference system constructed in accordance with the present invention.

Referring to FIG. 1, a three axis gyroscopic stable platform 10 is disclosed mounted for rotation with respect to a support 11 that is fixed on a base 12 such as an aircraft, for example. The outer roll gimbal 13 of the stable platform 10 is mounted for rotation about an axis 14 preferably coincident with the fore-aft or roll axis about which craft 12 rolls. The outer roll gimbal 13 is pivotally mounted to rotate about the axis 14 by means of spaced bearings 15 and 16. The pitch gimbal 20 of the stable platform 10 is mounted on the outer roll gimbal 13 by means of spaced bearings 21 and 22 for rotation about an axis 23 perpendicular to roll axis 14. The axis 23 is normally parallel with the athwartship axis about which the craft 12 pitches.

The pitch gimbal 20 cooperates with a vertical gyroscope 24 which has its inner gimbal 25 pivotally mounted to rotate with respect to the pitch gimbal 20 by means of spaced bearings 26 and 27 around an inner roll axis 28 that is normally parallel to the axis 14. The rotor assembly 30 of the vertical gyroscope 24 is, in turn, rotatably mounted by means of spaced bearings 32 and 33 to spin about a normally vertical spin axis 31 within the inner gimbal 25.

A directional gyroscope 35 is also mounted within the pitch gimbal 20 to provide azimuthal reference information. The directional gyroscope 35 is mounted on the portion of the pitch gimbal 20 which extends beyond the axis 23 and preferably below the vertical gyroscope 24 in order that the directional gyroscope 35 is not subject to temperature variations which would otherwise be caused by the presence of the vertical gyroscope 24. The outer or azimuth gimbal 36 of the directional gyroscope 35 is pivotally mounted for rotation about an azimuth axis 37 by means of spaced bearings 38 and 39. The azimuth axis 37 is normally maintained coincident with the vertical spin axis 31 of the vertical gyroscope rotor 30 in a manner further to be explained. The inner gimbal 46 is pivotally mounted within the outer gimbal 36 by means of spaced bearings 43 and 44 for rotation about an axis 45. The rotor assembly of the directional gyroscope 35 is, in turn, mounted to spin about a normally horizontal axis 47 within the inner gimbal 42 by means of spaced bearings 48 and 49.

Preferably, the respective pitch and roll accelerometers 50 and 51 are mounted on the pitch gimbal 20 to sense tilt of gimbal 20 from the gravity vertical position. The pitch and roll accelerometers 50 and 51 may, for example, be of the annular type disclosed in U.S. Pat. No. 3,604,275 entitled "Torodial Electrolytic Sensor" to T. S. Fox and G. W. Driskill, issued Sept. 15, 1971, and assigned to the Sperry Rand Corporation. The output of the pitch accelerometer 50 is coupled to a conventional pitch erection control amplifier 52 which, in turn, provides a signal to the pitch precession torque motor 53 for erecting the rotor assembly 30 to maintain the spin axis 31 of the latter vertical. Similarly, the output of the roll accelerometer 51 is coupled via a roll erection control amplifier 54 to a roll precision torque motor 55 for maintaining the spin axis 31 of rotor assembly 30 vertical. An inner roll gimbal pick off 60 is mounted to sense rotation of the inner gimbal 25 with respect to the pitch gimbal 20 and it thus provides a signal via switch 105 from roll followup servo amplifier 61 to a direct current servo motor 62 which is mounted to rotate the outer roll gimbal 13 about the axis 14. The spin axis 47 of the directional gyroscope 35 is maintained at right angles to its outer gimbal rotation axis 37 by means of a pick off 59 which provides a signal to a levelling torque motor 63 for precessing the directional gyro rotor assembly within gimbal 46 in a conventional manner. Pitch and roll attitude reference signals are provided at leads 72 and 73 by pitch and roll output resolvers 64 and 65 mounted on the outer roll gimbal 13 with respect to axes 23 and 14, respectively. An azimuthal reference signal is provided by an azimuth output resolver 66 mounted on the pitch gimbal 20 that is responsive to the movement of the azimuth gimbal 36 with respect to the azimuth axis 37.

In operation during unaccelerated aircraft flight, for example, the spin axis 31 of the vertical gyroscope 24 is maintained in a vertical position by the independent pitch and roll erection systems. Tilt about the pitch axis 23 is sensed by the pitch accelerometer 50 which provides a signal representative of the magnitude and sense of the tilt for amplification in the pitch erection control amplifier 52 and then for application to the pitch precession torque motor 53, thereby causing precession of the vertical gyroscope rotor assembly 30 in a direction to maintain the spin axis 31 thereof vertical. In a similar manner, tilt about the roll axis 14 is sensed by the roll accelerometer 51 which provides a roll signal that is amplified in the amplifier 54 and applied to the roll precession torque motor 55 in a sense to maintain the spin axis 31 of gyroscope 24 vertical. In a conventional manner, when the craft acceleration exceeds a predetermined value, the responsive annular pitch or roll accelerometer 50 or 51 provides a signal which is used to disable the respective erection amplifier for that axis to avoid erecting the vertical axis 31 to a false vertical. The normal erection procedure is again provided upon resumption of unaccelerated flight. Fast erection of the vertical gyroscope 24 may be provided during start up of the platform 10 by increasing the voltages applied to the pitch and roll precession torque motors 53 and 55, for example. Preferably, the pitch and roll accelerometers 50 and 51 are mounted on the stabilized pitch gimbal 20 in order to isolate their outputs from the influence of all pitch and roll attitudes of the craft 12.

One of the features of the platform is that the directional gyroscope 35 is mounted on the stabilized pitch gimbal 20 of the vertical gyroscope 24. By maintaining the outer gimbal axis 37 in a vertical orientation; i.e., by pitch and roll stabilization, improved free gyroscope drift performance and elimination of directional gyroscope gimballing errors are achieved. The vertical gyroscope 24 preferably has an angular momentum substantially greater than that of the directional gyroscope 35. With the directional gyroscope 35 mounted on the pitch gimbal 20 of the vertical gyroscope 24, the former is physically stabilized in pitch because of the high angular rotor momentum of the vertical gyroscope 24 with respect to that of the directional gyroscope 35. In the configuration of the present inventions, the roll drift uncertainty is reduced through use of the high angular momentum rotor vertical gyroscope stabilizing the relatively low angular momentum rotor directional gyroscope. Further, the configuration eliminates pitch drift uncertainty by servo positioning the directional gyroscope 35 about the roll axis 14 by means of a single roll follow-up servo system comprising the pick off 60, roll follow-up servo motor 61, and the direct current motor 62. Thus, by stabilizing the directional gyroscope 35 in pitch and roll, a heading or azimuthal output is provided on output 71 free from the intercardinal gimbal errors of a conventional directional gyroscope.

The gyroscopic system may also be viewed from another aspect in which the vertical gyroscope 24 is considered to be a three-gimbal device obtained by transforming a conventional two-gimbal vertical gyroscope by rotation 90° in azimuth, adding an outer or redundant servoed gimbal 13. The problems of mass shift normally associated with the pitch axis of a two-gimbal vertical gyroscope manifest themselves as roll drift uncertainties in the three-gimbal vertical configuration. As a result, the three-gimbal gyroscope has a significantly reduced susceptibility to lateral in-flight (turning) accelerations, but possesses higher sensitivity to fore-aft accelerations. However, a total over-all performance advantage is obtained with the three-gimbal gyroscope configuration.

The vertical gyroscope inner roll gimbal 25 serves as the housing for the rotor 30 and is stabilized about the inner roll axis 28 by the angular momentum of the gyroscope rotor 30. The pitch gimbal 20, in turn, is stabilized by the gyroscope rotor angular momentum about the pitch axis 23 and by the servo loop about the inner roll axis 28. Since the directional gyroscope 35 is located on the pitch gimbal 20, it is stabilized in the same manner; this arrangement prevents the gimbal mass uncertainty torques of the directional gyroscope 35 from affecting the vertical gyro drift rate about the pitch axis 23. An additional feature of the configuration lies in the elimination of the directional gyroscope slaving (precession) motor and consequently the reaction torque it would have on the vertical gyroscope 24 as described in the aforementioned Reed Pat. No. 3,648,525. Such is achieved through the use of the high angular momentum rotor for vertical gyroscope 24, which feature overcomes unwanted drift-producing torques that result from gimbal mass uncertainties.

The directional gyroscope 35 has full freedom about its azimuth output axis 37 with the azimuth output signal being provided by the precision resolver 66 on output 71. The respective pitch and roll outputs 72 and 73 of the platform 10 are provided by pitch and roll output resolvers 64 and 65, thereby providing in conjunction with the resolver 62 attitude information with respect to the craft 12 about three mutually perpendicular reference axes. As in the aforementioned Reed Pat. 3,648,525, undesirable reaction torques of slaving elements are avoided. The need for such a torquing device is eliminated, along with its additional weight and stringent performance requirements by instead providing the directional gyroscope precession compensation externally of the platform 10 through introducing compensating electronic signals in the external electronic control system 70. This arrangement further improves the directional gyroscope drift performance by eliminating residual torquer uncertainties and reduces power consumption requirements within the platform 10.

The gyroscopic stable platform 10 as described in the aforementioned Reed patent suffers from a particular defect under some conditions of operation in an aircraft. Because of this problem, the outer roll servo loop, which includes the inner roll gimbal pick-off 60, the roll follow up servo amplifier 61, the d.c. roll servo motor 62, and the mechanical coupling between the outer and inner roll motions via the platform gimbals, can become unstable at the pitch zenith angle. Although satisfactorily operating at pitch angles up to substantially 89° 45', the overall gain of the outer roll servo loop becomes insufficient at higher angles and this event may cause the outer roll gimbal 13 to oscillate or actually to spin in one direction.

This problem presents itself in part because the mechanical gain between the outer roll gimbal 13 and the inner roll gimbal 25 is proportional to the cosine of the pitch angle. Thus, when the pitch zenith angle is approached, this mechanical gain becomes very much smaller than the gain when the pitch angle is near zero. As a consequence, for a pitch angle of 90 degrees, there is no mechanical coupling from the outer roll gimbal 13 to the inner roll gimbal 25 and the outer roll servo (including elements 60, 61, and 62) becomes effectively an open loop circuit. If integration is present in the outer roll servo, there are inherently present integrator capacitors which require considerable time for discharging. Generally, the discharge time will be so great that the roll motor 62 will be driven hard in one direction and can even reach a spinning rotation rate approaching 600 revolutions per minute.

Even when rotating at relatively low pitch rates, the outer roll gimbal 13 may spin until the pitch angle is reduced to less than about 80 to 85°. When this point is reached, the gyroscopic system will often demonstrate one of two possible types of instability. Although the platform may actually stop spinning and resume normal operation, it may gyrate violently and possibly destructively, or it may continue to oscillate until the pitch angle is less than 80°, thereupon returning to normal operation.

To prevent the above described abnormal operation, it is arranged according to the present invention to automatically open switch 105 which is coupled between the inner roll gimbal pick-off 60 and the d.c. servo roll motor 62. The output of roll amplifier 61 is then disconnected from terminal 110 and switch blade 108 is moved from terminal 110 to the grounded terminal 109 through the action of mechanical linkage 107. For this purpose, linkage 107 is controlled in a conventional manner by a switch control 106 which may then be the solenoid of a relay. Switch control 106 is operative to ground the input of d.c. servo motor 62 upon the occurrence of an output from AND circuit 104. To produce an energizing output, three inputs must be simultaneously present for coupling into AND circuit 104.

The three signals desired simultaneously for operating AND circuit 104 are supplied by the pitch level detector 101, the pitch rate detector 102, and the inner roll angle detector 103. The inner roll pick off 60 serves to supply unidirectional signals to the inner roll angle detector 103, the amplitude of this signal being a function of the amplitude of the roll angle about axis 28. When the amplitude of the output of pick off 60 is equal to or less than about 1 angular degree, a finite signal is passed by the threshold level circuit comprising inner roll angle detector 103, thus providing one of the desired inputs to AND circuit 104. The second and third control elements 101 and 102 both employ an input signal found on pitch output lead 72 derived in the cosine winding of pitch resolver 64 operating about the pitch axis 23 of the outer gimbal 13. This signal is applied directly to the pitch level detector 101 and to the pitch rate detector 102. If the input signal to the elements 101 and 102 is of a predetermined magnitude, second and third inputs for AND circuit 104 become available for grounding the input to d.c. motor 62, thus preventing motor 62 from attempting to drive gimbal 13 when the unstable condition exists.

The pitch level detector 101 senses the fact that platform 10 is approaching the pitch zenith position, while the pitch rate detector 102 supplies an output if platform 10 will be at the pitch zenith position for a time long enough to allow the unstable condition to demonstrate its presence. The inner roll angle detector 103 senses the fact that the input to roll servo amplifier 61 is near zero or is zero. Only when these three conditions exists simultaneously is there a danger that the stable platform will become unstable. Therefore, by removing the output of amplifier 61 from controlling the d.c. servo motor 62 at that time, the undesirable movement of the outer roll loop is prevented.

In a typical example, the input to d.c. servo motor 62 is grounded when the pitch angle is greater than 89° 45' and when the inner roll angle is less than 1°. The interruption in the outer roll gimbal servo is initiated when pitch rates are five degrees per second or less.

Operation of the system while passing through the critical orientation is further benefited, as in FIG. 2, by permitting the switch control 106 of FIG. 1 to operate switch 105, as before, and also to determine the position of a second switch 120 and its blade 117 relative to terminals 115 and 116. In normal operation, the blade 117 is contacting the dummy terminal 115, but when the three control signals are present at the input of AND circuit 104, switch blade 117 is caused by mechanical linkage 107, 107b to contact terminal 116, thus rapidly discharging condenser 119 through resistor 118. Condenser 119 will be understood by those skilled in the art to represent any condenser in the outer gimbal servo loop which may tend undesirably to store or to integrate charge in the critical condition of the outer servo loop. Those skilled in the art will also understand that switches 105 and 120 have been illustrated, merely as a matter of convenience, as solenoid operated mechanical switches, but that known fully-electronic switching circuits or elements may be substituted for the mechanical switches.

FIGS. 3, 4, and 5 present analog circuits suitable for employment respectively as the pitch level detector 101, the pitch rate detector 102, and the inner roll angle detector 103. While the functions of these control elements may be performed in different ways within the scope of the invention, the illustrated analog circuits are representative satisfactory and inexpensive arrangements for use in the invention.

Referring now particularly to FIG. 3, a suitable form of the pitch level detector 101 is illustrated that derives its input at terminal 150 from the cosine winding of pitch resolver 64. As schematically illustrated, pitch level detector 101 monitors the amplitude of the input cosine of pitch angle signal and generates a positive unidirectional output at terminal 151 for pitch angles greater than 89° 45' and a negative unidirectional output for pitch angles less than 89° 45'. Amplifier 152, poled as illustrated in the drawing, and its associated circuit 153 operate in a conventional manner to convert the alternating signal appearing at terminal 150 into an appropriately scaled unidirectional signal appearing at output terminal 151. In turn, amplifier 154 and its associated circuit 155 operate in a conventional manner to compare the output of amplifier 152 appearing at junction 156 with a unidirectional electrical reference signal supplied at terminal 157 by a suitable conventional reference source (not shown). For a unidirectional signal level at the output 156 of amplifier 152 which is less than the level of the reference signal at terminal 157, the output at terminal 151 of amplifier 154 is the desired positive voltage, For an output of amplifier 152 which is greater than the reference level, the output of amplifier 154 on terminal 151 is the desired negative unidirectional voltage.

With respect to the pitch rate detector 102 of FIG. 4, its input is likewise derived from the pitch resolver 64. Pitch rate detector 102 monitors the amplitude of the cosine of pitch angle signal applied to its input terminal 160. A positive unidirectional output signal is generated at the output terminal 161 of monitor 102 if the pitch angle is greater than 89° 45' for a time period of 100 milliseconds or greater. Such a time period may correspond, for example, to a pitch rate of 5° per second. If the pitch angle does not remain greater than 89° 45' for at least 100 milliseconds, the output of the pitch rate detector 102 is a negative voltage. Amplifier 162 is analogous to amplifier 152 of FIG. 3, as amplifier 162 and its associated circuit 163 operate in a conventional manner to convert the alternating signal appearing at terminal 160 into an appropriately scaled unidirectional electrical signal. Amplifier 164, like amplifier 154, and its associated circuit 165 operate in a conventional way to compare the output of amplifier 162 appearing at junction 166 with a unidirectional reference signal supplied at terminal 167 by a suitable reference source (not shown). When the parameters of the conventional R-C network comprising resister 170 and capacitor 171 ar properly chosen, the output at the terminal 161 of amplifier 169 is a positive voltage only when the output of amplifier 164 at junction 172 has been positive for at least 100 milliseconds. Thus, the output at terminal 161 is positive for pitch rates less than 5° per second, and is negative for pitch rates greater than 5° per second.

With respect to the inner roll angle detector 103 of FIG. 5, it is supplied at terminal 180 with the output of the inner roll pick off 60, and generates a zero amplitude output signal at terminal 181 for inner roll angles greater than one degree. For inner roll angles less than one degree in magnitude, the output of detector 103 is positive. For this purpose, the conventional amplifier 182 generates an alternating voltage at its output terminal 185 only when the input voltage on terminal 180 exceeds the unidirectional reference voltage supplied at terminal 183 by a suitable reference voltage source (not shown). The alternating signal at terminal 185 is rectified by diode 186 and tends to charge capacitor 188 positively. This positive signal turns transistor 189 on, yielding a zero level output at terminal 181. In the absence of the alternating signal at terminal 185, transistor 189 is off and the signal at output terminal 181 is the desired positive unidirectional voltage in view of the voltage supplied at terminal 190.

While the invention has been described in its preferred embodiments, it is to be understood that the words which have been used are words of description rather than of limitation and changes within the purview of the appended claims may be made without departure from the true scope and spirit of the invention in its broader aspects.

I claim:

1. A three axis gyroscopic stable reference apparatus for navigable craft comprising:
   first gimbal means pivotally mounted for rotation about a roll axis,
   second gimbal means pivotally mounted on said first gimbal means for rotation about a pitch axis,
   vertical gyroscope means for which said second gimbal means forms the outer gimbal means and further having inner gimbal means pivotally mounted on said second gimbal means for rotation about an inner roll axis,
   directional gyroscope means pivotally mounted on said second gimbal means for providing an azimuthal reference,
   control means including accelerometer means for providing signals representative of tilt in pitch and roll to maintain the spin axis of said vertical gyroscope means aligned with the gravity vertical,
   inner gimbal pick off means responsive to said rotation of said inner gimbal means about said inner roll axis,
   servo means responsive to said gimbal pick off means for rotating said first gimbal means to maintain said pitch axis perpendicular to said vertical gyroscope means spin axis,
   pitch, roll, and azimuth pick off means coupled to said stable reference apparatus for providing attitude information about mutually perpendicular reference axes, and
   circuit means for disabling said servo means jointly responsive to said pitch pick-off means and to said inner gimbal pick-off means for preventing unstable operation of said servo means.

2. A three axis gyroscopic stable reference apparatus for navigable craft comprising:
   first gimbal means pivotally mounted for rotation about a roll axis,
   second gimbal means pivotally mounted on said first gimbal means for rotation about a pitch axis,
   vertical gyroscope means for which said second gimbal means forms the outer gimbal means and further having inner gimbal means pivotally mounted on said second gimbal means for rotation about an inner roll axis,
   directional gyroscope means pivotally mounted on said second gimbal means for providing an azimuthal reference,
   control means including accelerometer means for providing signals representative of tilt in pitch and roll to maintain the spin axis of said vertical gyroscope means aligned with the gravity vertical,
   inner gimbal pick-off means responsive to said rotation of said inner gimbal means about said inner roll axis,
   servo means responsive to said gimbal pick-off means for rotating said first gimbal means to maintain said pitch axis perpendicular to said vertical gyroscope means spin axis,
   pitch, roll, and azimuth pick-off means coupled to said stable reference apparatus for providing attitude information about mutually perpendicular reference axes, and
   circuit means for disabling said servo means jointly responsive to said pitch pick-off means and to said inner gimbal pick-off means for preventing unstable operation of said servo means, said circuit means including time coincidence circuit means for disabling said servo means.

3. Apparatus as described in claim 2 wherein said coincidence circuit means is responsive to:
   pitch level detector means responsive to said pitch pick-off means, and
   pitch time rate of change detector means responsive to said pitch pick-off means.

4. Apparatus as described in claim 3 wherein said pitch level detector means produces an output in response to said pitch pick-off means at a first predetermined value of said pitch angle.

5. Apparatus as described in claim 4 wherein said pitch time rate of change detector means produces an output in response to said pitch pick-off means for a predetermined value of pitch time rate of change.

6. Apparatus as described in claim 5 wherein said coincidence circuit means is responsive to said inner gimbal pick-off means for output signals therefrom of a third predetermined magnitude.

7. Apparatus as described in claim 2 wherein said servo means includes capacitor storage means and switch means adapted to discharge said capacitor storage means simultaneously with the disabling of said servo means.

8. Apparatus as described in claim 7 wherein said vertical gyroscope means has a normally vertical spin axis and a substantially greater angular momentum than said directional gyroscope means for directly stabilizing said directional gyroscope means.

* * * * *